(12) United States Patent
Suzuki et al.

(10) Patent No.: US 7,407,576 B2
(45) Date of Patent: Aug. 5, 2008

(54) SEPARATING AGENT FOR AN OPTICAL ENANTIOMERIC ISOMER

(75) Inventors: Shinsuke Suzuki, Himeji (JP); Atsushi Onishi, Tsukuba (JP); Kazumi Suzuki, Himeji (JP)

(73) Assignee: Daicel Chemical Industries, Ltd., Sakai-shi, Osaka (JP)

( * ) Notice: Subject to any disclaimer, the term of this patent is extended or adjusted under 35 U.S.C. 154(b) by 140 days.

(21) Appl. No.: 10/533,217

(22) PCT Filed: Nov. 13, 2003

(86) PCT No.: PCT/JP03/14450

§ 371 (c)(1),
(2), (4) Date: Apr. 28, 2005

(87) PCT Pub. No.: WO2004/046714

PCT Pub. Date: Jun. 3, 2004

(65) Prior Publication Data
US 2006/0011533 A1 Jan. 19, 2006

(30) Foreign Application Priority Data
Nov. 19, 2002 (JP) .............................. 2002-334724

(51) Int. Cl.
*B01D 15/08* (2006.01)
(52) U.S. Cl. .................. 210/198.2; 210/635; 210/656; 210/502.1; 502/404
(58) Field of Classification Search .............. 210/198.2, 210/656, 502.1; 502/404
See application file for complete search history.

(56) References Cited

U.S. PATENT DOCUMENTS 6,217,769 B1    4/2001    Okamoto et al.

6,736,967 B2    5/2004    Ohnishi et al.

FOREIGN PATENT DOCUMENTS

| JP | 57-197034 | 12/1982 |
|---|---|---|
| JP | 7-30122 | 11/1987 |
| JP | 4-202141 | 7/1992 |
| JP | 6-154591 | 6/1994 |
| JP | 6-308108 | 11/1994 |
| JP | 11-171800 | 6/1999 |
| JP | 2001-296288 | 10/2001 |
| JP | 2003-098167 | 4/2003 |
| WO | WO 97/04011 | 2/1997 |
| WO | WO 99/51316 | 10/1999 |

OTHER PUBLICATIONS

PTO Translation No. 07-2942 of Japan Patent No. 57-197034.*
PTO Translation No. 04-4002 of Japan Patent No. 2001-296288.*
Useful Chiral Packing Materials for High-Performance Liquid Chromatography Resolution of Enantiomers: Phenylcarbamates of Polysaccharides Coated on Silica Gel, by Yoshio Okamoto et al, J. Am. Chem. Soc., vol. 106, No. 18, 1984, pp. 5358-5359.

* cited by examiner

*Primary Examiner*—Ernest G Therkorn
(74) *Attorney, Agent, or Firm*—Flynn, Thiel, Boutell & Tanis, P.C.

(57) ABSTRACT

The present invention is to provide a method of producing a separating agent for an enantiomeric isomer having a high optical resolution power together with sufficient solvent resistance. That is, a method of producing a separating agent for an enantiomeric isomer comprising the steps of allowing the porous carrier to carry the optically active polymer compound by bringing the porous carrier into contact with a dope of the optically active polymer compound and exposing a product to radiation.

3 Claims, No Drawings

SEPARATING AGENT FOR AN OPTICAL ENANTIOMERIC ISOMER

REFERENCE TO RELATED APPLICATIONS

This application is a 371 of PCT/JP03/14450 filed Nov. 13, 2003.

TECHNICAL FIELD TO WHICH THE INVENTION BELONGS

The present invention relates to a separating agent for an enantiomeric isomer, a method of producing the same, and the like. The separating agent for an enantiomeric isomer is used for high-performance liquid chromatography (HPLC).

PRIOR ART

Optically active polymer compounds, especially polysaccharides or derivatives thereof such as ester or carbamate derivatives of cellulose or amylose, have been hitherto known to show high optical resolution power. Further, separating agents for chromatography having the optically active polymer compounds physically adsorbed or carried on silica gel have been also known as excellent separating agents, each showing an optical resolution power in a wide range, a large theoretical plate number, and high durability (Y. Okamoto, M. Kawashima, and K. Hatada, J. Am. Chem. Soc., 106, 5357, 1984).

However, the separating agents can be used only under restricted separation conditions, since the optically active polymer compounds are carried by silica gel using physical adsorption and thus solvents capable of dissolving the optically active polymer compounds cannot be used as mobile phases and the like. Further, solvents capable of dissolving samples are restricted. A sample having a low degree of solubility in the solvents that can be used as the mobile phases causes a serious problem particularly in chromatographic separation. Moreover, there is another problem in that only limited washing fluids can be used in washing away contaminants strongly adsorbed on the separating agents. In consideration of those points, separating agents further having a high solvent resistance have been strongly required.

In order to solve such problems, there has been proposed a method of fixing an optically active polymer compound such as a polysaccharide derivative on a carrier. JP-A 4-202141 discloses a separating agent for an enantiomeric isomer prepared through direct copolymerization of a polysaccharide derivative having a vinyl group, which is introduced into a hydroxyl group site of a polysaccharide via an ester bond or a urethane bond, with a porous carrier having a vinyl group introduced thereinto.

In addition, the inventors of the present invention have disclosed in JP-B 7-30122 a technique of securing the stability of both a polysaccharide derivative and silica gel by chemically bonding the polysaccharide derivative to the silica gel via an isocyanate derivative. The inventors of the present invention have further proposed in JP-A 11-171800 a method of fixing a cellulose derivative carried on silica gel through radical copolymerization of styrene and divinylbenzene as a net structure thereon.

However, those methods have problems in that preparation of a special isocyanate derivative is required and that the production process requires many steps. Thus, those methods are not suitable for production at an industrial level.

Meanwhile, WO97/04011 discloses a polysaccharide derivative prepared by photochemically crosslinking a polysaccharide derivative having no photopolymerizable functional groups, and a method of producing the same. However, the method of photochemically crosslinking the polysaccharide derivative having no photopolymerizable functional groups involves very difficult control of a crosslinking rate, and the method does not allow the polysaccharide derivative to be produced with good reproducibility. Further, the method has a problem of a great difficulty in mass production due to a low light transmittance thereof and therefore is not suitable for production in an industrial scale.

Accordingly, a separating agent for an enantiomeric isomer which has a high optical resolution power inherent in an optically active polymer compound together with a high solvent resistance and which can be produced easily has been strongly desired.

DISCLOSURE OF THE INVENTION

An object of the present invention is therefore to provide a separating agent for an enantiomeric isomer having a high optical resolution power inherent in an optically active polymer compound together with sufficient solvent resistance, a method of producing the same, and a method of separating an enantiomeric isomer using the separating agent.

The present invention provides a separating agent for an enantiomeric isomer, including an optically active polymer compound carried on a porous carrier, in which the optically active polymer compound is insolubilized through exposure to radiation.

Further, the present invention provides a method of producing the separating agent for an enantiomeric isomer, including the steps of: allowing the porous carrier to carry the optically active polymer compound by bringing the porous carrier into contact with a dope of the optically active polymer compound; and exposing a product to radiation.

The present invention is particularly suitably used for high-performance liquid chromatography (HPLC).

DETAILED DESCRIPTION OF THE INVENTION

Hereinafter, a method of producing a separating agent for an enantiomeric isomer of the present invention and the separating agent for an enantiomeric isomer of the present invention will be described. Normal treatment conducted by a person skilled in the art may be added to the following respective production steps, and the respective production steps may be conducted as separate independent steps or as a continuous process.

A first step involves allowing a porous carrier to carry the optically active polymer compound by bringing the porous carrier into contact with a dope of the optically active polymer compound.

A contact method between the porous carrier and the dope of the optically active polymer compound is not particularly limited. Examples of the contact method that can be applied include: a method involving applying a dope of an optically active polymer compound on a porous carrier using an appropriate instrument or device; and a method involving placing a porous carrier in a vessel, adding a dope of an optically active polymer compound therein, and stirring and mixing the whole by mechanical means or manually. After the optically active polymer compound is carried on the porous carrier, a solvent remaining on the porous carrier together with the optically active polymer compound is preferably removed through vaporization.

Through the treatment of the first step, the optically active polymer compound is carried on a surface of the porous carrier including its pores. A carried state differs depending on a combination of the porous carrier and the optically active polymer compound. Examples of the state include: a state in which an optically active polymer compound adheres onto a porous carrier through simple physical adsorption or the like; and a state in which a porous carrier and an optically active polymer compound are chemically bonded.

In the first step, a process including the steps of: dividing a predetermined amount of the dope of the optically active polymer compound into a plurality of parts; bringing part of the dope into contact with the porous carrier; and drying a product may be repeated a plurality of times, as a step of allowing the porous carrier to carry the optically active polymer compound.

The dope of the optically active polymer compound is divided into preferably 2 to 20 parts, more preferably 2 to 10 parts.

The step of drying the product is for removing through vaporization a solvent used for obtaining the dope, and is conducted at a normal pressure or reduced pressure, at normal temperatures or under heating, and in a stream of a gas.

The steps of bringing part of the dope into contact with the porous carrier and drying the product are repeated preferably 2 to 20 times, more preferably 2 to 10 times. An amount of the dope used each time may be the same or different from those of other times.

The first step employs such a carrying method divided into a plurality of times, and thus the optically active polymer compound can be carried more uniformly on the entire surface of the porous carrier. This is preferable because a higher separative power can be provided for the separating agent for an enantiomeric isomer.

A porous organic carrier or a porous inorganic carrier can be used as the porous carrier. Of those, a porous inorganic carrier is preferable.

Examples of appropriate porous organic carriers include polymer substances made of polystyrene, polyacrylamide, polyacrylate, and the like. Examples of appropriate porous inorganic carriers include silica, alumina, magnesia, glass, kaolin, titanium oxide, silicate, and hydroxyapatite. However, silica gel is particularly preferable. When silica gel is used, its surface is desirably subjected to silane treatment (silane treatment using aminopropylsilane), plasma treatment, or the like in order to eliminate the influence of silanol remaining on the silica gel surface and to enhance an affinity for the optically active polymer compound. However, no problems occur even when the surface is subjected to no treatment.

The porous carrier, particularly silica gel, has a particle size preferably in the range of 1 to 300 μm, more preferably in the range of 2 to 100 μm, still more preferably in the range of 3 to 50 μm, and an average pore size preferably in the range of 60 to 8,000 Å, more preferably in the range of 120 to 4,000 Å, still more preferably in the range of 300 to 3,000 Å. The particle size of the porous carrier is substantially the particle size of a separating agent.

An average pore size of the porous carrier in the above range is preferable because the solution of the optically active polymer compound is sufficiently immersed in pores and the optically active polymer compound tends to evenly adhere to the inner walls of the pores. Furthermore, the pores are not closed, so the pressure loss of the filler can be kept at a low level.

The optically active polymer compound is preferably an optically active polymer compound containing no polymerizable unsaturated groups and is more preferably a polysaccharide derivative. A polysaccharide derivative having all the same substituted derivatives is particularly preferable from the viewpoint of easily forming an orderly supermolecular structure of the optically active polymer compound.

A polysaccharide, from which the polysaccharide derivative is derived, may be a synthetic polysaccharide, a natural polysaccharide or a natural product-modified polysaccharide. Anyone may be used as long as it is optically active. One having a high regularity of form of bonding is desirably used.

Examples of the polysaccharide include β-1,4-glucan (cellulose), α-1,4-glucan (amylose, amylopectin), α-1,6-glucan (dextran), β-1,6-glucan (pustulan), β-1,3-glucan (for example, curdlan, schizofillan, etc.), α-1,3-glucan, β-1,2-glucan (Crown Gall polysaccharide), β-1,4-galactan, β-1,4-mannan, α-1,6-mannan, β-1,2-fructan (inulin), β-2,6-fructan (levan), β-1,4-xylan, β-1,3-xylan, β-1,4-chitosan, α-1,4-N-acetylchitosan (chitin), pullulan, agarose, alginic acid, etc. as well as amylose-containing starch.

Among these, cellulose, amylose, β-1,4-xylan, β-1,4-chitosan, chitin, β-1,4-mannan, inulin, curdlan, etc., from which high purity polysaccharides are readily available, are preferred, with cellulose and amylose being particularly preferred.

The number average degree of polymerization (average number of pyranose or furanose ring contained in one molecule) of these polysaccharides is preferably 5 or more, more preferably 10 or more. There is no particular upper limit in the number average degree of polymerization but it is desirably 1,000 or less in consideration of ease of handling. It is more preferably 5 to 1,000, further more preferably 10 to 1,000, and particularly preferably 10 to 500.

Each of the polysaccharide derivatives obtained by bonding the part or whole of the hydroxyl groups of the above polysaccharides with compounds having functional groups capable of reacting with hydroxyl groups through ester bonds, urethane bonds, ether bonds, and the like can be used as the polysaccharide derivative.

Examples of a compound having a functional group capable of reacting with a hydroxyl group, which may be any one as long as the compound has a leaving group, include an isocyanic acid derivative, a carboxylic acid, an ester, an acid halide, an acid amide compound, a halogen compound, an aldehyde, and an alcohol. Aliphatic, alicyclic, aromatic, and heteroaromatic compounds of the above compounds can also be used.

As a particularly preferable polysaccharide derivative, at least one derivative selected from the group consisting of a cellulose ester derivative, a cellulose carbamate derivative, an amylose ester derivative and an amylose carbamate derivative can be cited.

The solvent used for preparing the dope of the optically active polymer compound, indicating a solution or a dispersion liquid in the present invention, is not particularly limited as long as the solvent can dissolve or disperse the optically active polymer compound, and the following solvents can be used.

Examples of the solvent include: ketone-based solvents such as acetone, ethyl methyl ketone, and acetophenone; ester-based solvents such as ethyl acetate, methyl acetate, propyl acetate, methyl propionate, methyl benzoate, and phenyl acetate; ether-based solvents such as tetrahydrofuran, 1,4-dioxane, diethyl ether, and tert-butyl methyl ether; amide-based solvents such as N,N-dimethylformamide and N,N-dimethylacetamide; imide-based solvents such as N,N-dimethylimidazolidinone; halogen-based solvents such as chloroform, methylene chloride, carbon tetrachloride, and 1,2-dichloroethane; hydrocarbon-based solvents such as pentane, petroleum ether, hexane, heptane, octane, benzene, toluene, xylene, and mesitylene; urea-based solvents such as tetramethyl urea; alcohol-based solvents such as methanol, ethanol, propanol, and butanol; acid-based solvents such as acetic acid, trifluoroacetic acid, formic acid, phenol, and catechol; and amine-based solvents such as diethylamine, triethylamine, and pyridine.

A mixing ratio between the optically active polymer compound and the solvent is preferably 300 to 10,000 parts by mass, more preferably 300 to 1,000 parts by mass of the solvent with respect to 100 parts by mass of the optically active polymer compound.

A ratio of the dope of the optically active polymer compound to the porous carrier is preferably 50 to 5,000 parts by mass, more preferably 100 to 1,000 parts by mass of the dope of the optically active polymer compound with respect to 100 parts by mass of the porous carrier.

A second step involves exposing the treated product obtained through the treatment of the first step to radiation. A chemical bond is formed between the optically active polymer compounds in a crosslinking reaction through the treatment of the second step. A chemical bond may also be formed between the porous carrier and the optically active polymer compound by crosslinking.

Examples of the radiation include α-rays, β-rays, γ-rays, X-rays, and an electron beam. Of those, γ-rays and an electron beam are particularly preferably used, and γ-rays are most preferably used.

A γ-ray irradiation dose is preferably 1 kGy to 2,000 kGy, more preferably 10 kGy to 1,000 kGy, furthermore preferably 50 kGy to 500 kGy. For an exposure dose of 500 kGy or more, an electron beam is preferably used.

When the treated product is exposed to radiation, a third component such as diphenylmethane diisocyanate, epichlorohydrin, maleic chloride, isocyanate, epoxy, or dicarboxylic acid may be added for accelerating a crosslinking reaction by radiation. The third component is added in an amount of preferably 0.01 to 50 parts by mass, more preferably 0.05 to 20 parts by mass, furthermore preferably 0.1 to 10 parts by mass with respect to 100 parts by mass in total of the porous carrier and the polymer compound.

In the treatment of the second step, the treated product obtained in the first step may be exposed to radiation in a state being dispersed in a solvent. It is preferable to expose the treated product to radiation in a state being dispersed in a solvent because the entire treated product can be exposed to radiation uniformly. Such exposure is particularly suitable for the treated product in a large amount as in production at an industrial level. An amount of the treated product that can be exposed to radiation at a time is preferably set in a range of about 1 g to about 100 kg, but may be set out of the above range.

When such treatment is conducted, a step of dispersing in a solvent a product having an optically active polymer compound carried on a porous carrier is conducted after the treatment of the first step and before the treatment of the second step.

Examples of a dispersion solvent include water, an alcohol-based solvent, an ester-based solvent, and an ether-based solvent. Of those, water and an alcohol-based solvent are preferably used. Examples of the alcohol-based solvent particularly preferably used include methanol, ethanol, and 2-propanol.

A concentration of the dispersion liquid is preferably 30 to 80 mass %, particularly preferably 50 to 70 mass %. A concentration of the dispersion liquid of 30 mass % or more indicates an appropriate amount of a dispersant and provides high irradiation efficiency and an advantageous irradiation cost. A concentration of the dispersion liquid of 80 mass % or less allows sufficient immersion of the optically active polymer compound on the surface of the porous carrier in a solvent, to thereby favorably advance a crosslinking reaction through exposure to radiation.

After the second step, a step of washing the treated product obtained through the treatment of the second step in an organic solvent capable of dissolving the optically active polymer compound can be provided. The treatment of the step allows removal of an optically active polymer compound forming no chemical bond through exposure to radiation in the second step.

The organic solvent to be used capable of dissolving the optically active polymer compound can be the same as that of the first step.

A volume of the organic solvent used is preferably 5 to 15 times that of the treated product.

A washing method is not particularly limited, and examples thereof that can be used include: a method involving pouring an organic solvent on the treated product and naturally filtering or filtering under reduced pressure at the same time; a method involving stirring the treated product in an organic solvent under heating; and a method involving packing the treated product in a column tube once and then passing an organic solvent therethrough with a pump. Such a washing step can be repeated a plurality of times as required.

Washing treatment conducted is such that an elution amount of the optically active polymer compound is 1,000 ppm or less, preferably 700 ppm or less, more preferably 500 ppm with respect to that of the separating agent after the washing treatment when 1,000 ml of a solvent capable of dissolving the optically active polymer compound is passed therethrough. An elution amount of the optically active polymer compound of 1,000 ppm or less is effective for preventing impurity contamination in separation of an enantiomeric isomer using the obtained separating agent for an enantiomeric isomer.

An amount (mass ratio of the optically active polymer compound in the separating agent for an enantiomeric isomer) of the optically active polymer compound carried on the separating agent for an enantiomeric isomer of the present invention is preferably 3 to 40 mass %, more preferably 5 to 35 mass %, and furthermore preferably 10 to 30 mass %.

The separating agent for an enantiomeric isomer of the present invention is used by packing in a column. The separating agent for an enantiomeric isomer of the present invention may be packed into one column or a plurality of columns, and then may be applied to various types of chromatography.

The separating agent for an enantiomeric isomer of the present invention is useful as a separating agent for chromatography such as gas chromatography, liquid chromatography, supercritical chromatography, simulated moving bed chromatography, or thin-film chromatography. The separating agent for an enantiomeric isomer is particularly preferably used as a separating agent for liquid chromatography.

The separating agent for an enantiomeric isomer of the present invention has a high optical resolution power together with a sufficient solvent resistance, can be produced easily, and thus is useful for separation of various enantiomeric isomers.

EXAMPLES

Hereinafter, the present invention will be described in detail by examples, but the present invention is not limited thereto.

Example 1

First Step

Carrying of amylose tris[(S)-phenylethylcarbamate] on silica gel

1) Surface Treatment of Silica Gel

Porous silica gel (particle size of 20 μm) was reacted with 3-aminopropyltriethoxysilane for aminopropylsilane treatment (APS treatment). The obtained APS treated-silica gel was reacted with an isocyanate compound, to thereby obtain silica gel subjected to carbamoyl surface treatment.

2) Synthesis of amylose tris[(S)-phenylethylcarbamate]

In a nitrogen atmosphere, 109 g (2 equivalents with respect to an amylose hydroxyl group) of (S)-phenylethylisocyanate was added to a mixture containing 20 g of amylose and 500 ml of dry pyridine, and the whole was stirred under heating at a reflux temperature of pyridine for 24 hours. A reaction mixture was left standing to cool and then was poured into methanol, to thereby precipitate the target amylose tris[(S)-phenylethylcarbamate] which was collected on a glass filter (at an yield of 93%).

3) Carrying of amylose tris[(S)-phenylethylcarbamate] on silica gel 20 g of amylose tris[(S)-phenylethylcarbamate] obtained in step 2) was dissolved in tetrohydrofuran (THF), to thereby prepare a polymer dope. The polymer dope was divided into two parts, and half of the polymer dope was applied on 40 g of silica gel obtained in step 1) using a mechanical stirrer. After the application, THF was distilled off under reduced pressure. The remaining half of the polymer dope was applied uniformly thereon in the same manner and THF was distilled off, to thereby obtain a product having the target amylose tris[(S)-phenylethylcarbamate] carried on silica gel.

(Second Step)

20 g of the treated product obtained in the first step was dried. 200 ml of methanol was added thereto, and the mixture was left standing for 1 hour. Then, excess methanol was removed through filtration under reduced pressure. The treated product was put in a polyethylene reclosable bag, and the whole was irradiated with γ-rays of 300 kGy (irradiation device with an radiation source of cobalt 60 (radiation source loading of 37 PBq)), to thereby obtain a separating agent for an enantiomeric isomer.

Example 2

A separating agent for an enantiomeric isomer was obtained in the same manner as in Example 1 except that the dispersion solvent was changed from methanol to a mixed solvent of methanol/water=50/50 (volume ratio).

Example 3

A separating agent for an enantiomeric isomer was obtained in the same manner as in Example 1 except that the dispersion solvent was changed from methanol to water.

Comparative Example 1

The treated product obtained after the treatment of the first step of Example 1 (before the treatment of the second step) was used as a separating agent.

Application Example 1

The separating agent for an enantiomeric isomer prepared in each of Examples 1 to 3 and Comparative Example 1 was packed into a stainless column having a length of 25 cm and an inner diameter of 1.0 cm through a slurry packing method, to thereby prepare a separation column for an enantiomeric isomer. The following four compounds (racemic modification 1 to 4) were optically resolved using the obtained separation column for an enantiomeric isomer.

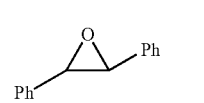

Racemic modification 1

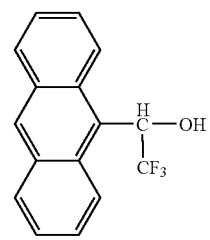

Racemic modification 2

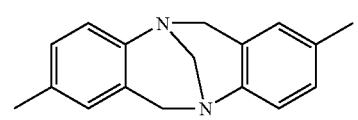

Racemic modification 3

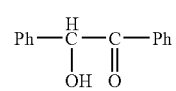

Racemic modification 4

In the formulae, ph represents a phenyl group.

Analysis Conditions

Mobile phase: n-hexane/2-propanol=9/1

Column temperature: 25° C.

Flow rate: 1.0 ml/min

UV detector: 254 nm

A separation factor α in a liquid chromatography separation device is defined as follows. Table 1 shows the separation factors α obtained under the above conditions.

$\alpha = k2'/k1$

Here, $k1'=(t_1-t_0)/t_0$, and $k2'=(t_2-t_0)/t_0$. $t_1$ and $t_2$ each represent an elution time of an enantiomeric isomer, and $t_0$ represents an elution time of tri-tert-butylbenzene.

TABLE 1

|   |   | Ex. 1 | Ex. 2 | Ex. 3 | Com. Ex. 1 |
|---|---|---|---|---|---|
| α | Racemic modification 1 | 1.34 | 1.35 | 1.34 | 1.47 |
|   | Racemic modification 2 | 2.3 | 2.31 | 2.34 | 2.47 |
|   | Racemic modification 3 | 2.41 | 2.44 | 2.4 | 2.26 |
|   | Racemic modification 4 | 2.12 | 2.12 | 2.09 | 2.88 |

Example 4

6.5 g of the separating agent for an enantiomeric isomer obtained in Example 3 was placed on a glass filter, and 50 ml of THF was added thereto. The mixture was stirred for a few minutes, and was filtered under a reduced pressure (a suction pressure of 4 kPa (=30 Torr) and a pressure difference of 97 kPa (=730 Torr)). The procedure was repeated 3 times. A separation factor α was determined using the obtained filler in the same manner as in Application Example 1. Table 2 shows the results.

Comparative Example 2

A filler was washed in the same manner as in Example 4 except that the separating agent for an enantiomeric isomer of Comparative Example 1 was used. A separation factor α was determined using the obtained filler. Table 2 shows the results.

TABLE 2

| Racemic modification | Ex. 4 | Com. Ex. 2 |
|---|---|---|
| 1 | 1.0 | 1.0 |
| 2 | 1.58 | 1.0 |
| 3 | 2.05 | 1.0 |
| 4 | 1.68 | 1.0 |

Example 5

First Step

Carrying of amylose tris(3,5-dimethylphenylcarbamate) on silica gel

1) Surface Treatment of Silica Gel

Silica gel was subjected to surface treatment in the same manner as in step 1) of Synthesis Example 1.

2) Synthesis of amylose tris(3,5-dimethylphenylcarbamate)

In a nitrogen atmosphere, 10.0 g of amylose and 82.2 g (3 equivalents) of 3,5-dimethylphenylisocyanate were stirred in 360 ml of dry pyridine under heating at a reflux temperature of pyridine for 60 hours, and the whole was then poured into 6.0 L of methanol. A precipitated solid was collected on a glass filter, washed with methanol a plurality of times, and subjected to vacuum drying (80° C., 5 hours). As a result, 35.3 g (yield of 95%) of a slightly yellowish white solid was obtained.

3) Carrying of amylose tris(3,5-dimethylphenylcarbamate) on silica gel 10 g of amylose tris(3,5-dimethylphenylcarbamate) obtained in step 2) was dissolved in ethyl acetate, to thereby prepare a polymer dope. The total amount of the polymer dope was applied on 40.0 g of silica gel obtained in step 1) using a mechanical stirrer. After the application, the solvent was distilled off under reduced pressure, to thereby obtain a product having the target amylose tris(3,5-dimethylphenylcarbamate) carried on silica gel.

Second Step

The treated product obtained in the first step was dried and directly irradiated with γ-rays, to thereby obtain a separating agent for an enantiomeric isomer irradiated with γ-rays. The conditions of the γ-ray irradiation were the same as those of Example 1.

Example 6

A separation factor α was determined in the same manner as in Application Example 1 except that the separating agent for an enantiomeric isomer prepared in Example 5 was used. Table 3 shows the results.

Comparative Example 3

A treated product after the treatment of the first step of Example 5 (before the treatment of the second step) was used as a separating agent, and a separation factor α was determined in the same manner as in Application Example 1. Table 3 shows the results.

TABLE 3

| Racemic modification | Ex. 6 | Com. Ex. 3 |
|---|---|---|
| 1 | 3.24 | 3.11 |
| 2 | 1.24 | 1.28 |
| 3 | 1.71 | 1.79 |
| 4 | 1.3 | 1.31 |

Example 7

6.5 g of the separating agent for an enantiomeric isomer obtained in Example 5 was placed on a glass filter, and 50 ml of THF was added thereto. The mixture was stirred for a few minutes, and was filtered under a reduced pressure (a suction pressure of 4 kPa (=30 Torr) and a pressure difference of 97 kPa (=730 Torr)). The procedure was repeated 3 times. A separation factor α was determined using the obtained filler in the same manner as in Application Example 1. Table 4 shows the results.

Comparative Example 4

A filler was washed in the same manner as in Example 7 except that the separating agent for an enantiomeric isomer of Comparative Example 3 was used. A separation factor α was determined using the obtained filler. Table 4 shows the results.

TABLE 4

| Racemic modification | Ex. 7 | Com. Ex. 4 |
|---|---|---|
| 1 | 2.56 | 1.0 |
| 2 | 1.0 | 1.0 |
| 3 | 1.42 | 1.0 |
| 4 | 1.19 | 1.0 |

The invention claimed is:

1. A separating agent for an enantiomeric isomer, comprising amylose tris [(S)-phenylethylcarbamate] an optically active polymer compound carried on a porous carrier, the optically active polymer compound having been insolubilized through exposure to 50-500 kGy of γ-ray radiation.

2. The separating agent for an enantiomeric isomer according to claim 1, wherein the optically active polymer compound contains no polymerizable unsaturated group.

3. The separating agent for an enantiomeric isomer according to claim 1, wherein the porous carrier is silica gel.

* * * * *